(12) United States Patent
Lanoue et al.

(10) Patent No.: US 10,747,760 B2
(45) Date of Patent: Aug. 18, 2020

(54) METHOD AND SYSTEM FOR TRACKING VIRTUAL REALITY EXPERIENCES

(71) Applicant: Capital One Services, LLC, McLean, VA (US)

(72) Inventors: Christopher Lanoue, Brooklyn, NY (US); R. M. Keelan Downton, Arlington, VA (US); Paul Buffa, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/003,242

(22) Filed: Jun. 8, 2018

(65) Prior Publication Data
US 2019/0377812 A1  Dec. 12, 2019

(51) Int. Cl.
*G06F 16/24* (2019.01)
*G06F 16/2452* (2019.01)
*G06F 16/29* (2019.01)
*G06T 11/20* (2006.01)
*G06F 3/01* (2006.01)

(52) U.S. Cl.
CPC .......... *G06F 16/2452* (2019.01); *G06F 16/29* (2019.01); *G06T 11/206* (2013.01); *G06F 3/012* (2013.01); *G06F 3/013* (2013.01); *G06F 3/017* (2013.01)

(58) Field of Classification Search
CPC ...... G06F 16/2452; G06F 3/011; G06F 3/017; G06F 3/013; G06F 3/012; G06F 16/29; G06Q 30/00; H04L 67/38; G06T 11/206
See application file for complete search history.

(56) References Cited

U.S. PATENT DOCUMENTS

| | | | |
|---|---|---|---|
| 9,363,569 B1* | 6/2016 | van Hoff | G06Q 30/0263 |
| 2012/0174017 A1* | 7/2012 | Tidwell | G06Q 10/10 715/772 |
| 2013/0054576 A1* | 2/2013 | Karmarkar | G06F 17/30861 707/722 |
| 2015/0149611 A1* | 5/2015 | Lissack | H04L 43/0817 709/224 |

(Continued)

FOREIGN PATENT DOCUMENTS

JP  6298561  3/2018

*Primary Examiner* — Alicia M Willoughby
(74) *Attorney, Agent, or Firm* — DLA Piper LLP (US)

(57) ABSTRACT

Embodiments disclosed herein generally relate to a system and method for tracking virtual reality experiences. A computing system receives a plurality of location coordinates of a user during a VR simulation. The computing system uploads the plurality of location coordinates to a database. The computing system prompts a client device that an API linking the client device of the user to functionality of the database is available. The computing system receives a query via the API. The computing system translates the received query to a query compatible with the database. The computing system queries the database using the received query for according to criteria set forth in the received query to retrieve a set of location information. The computing system generates a heat map based on the retrieved location information. The computing system prompts the remote client device that the heat map is available for display.

19 Claims, 4 Drawing Sheets

(56) References Cited

U.S. PATENT DOCUMENTS

| | | | |
|---|---|---|---|
| 2016/0196687 A1* | 7/2016 | Alpert | G06T 17/05 |
| | | | 345/419 |
| 2016/0210602 A1* | 7/2016 | Siddique | G06Q 20/0453 |
| 2016/0300392 A1* | 10/2016 | Jonczyk | G06T 19/003 |
| 2017/0085964 A1 | 3/2017 | Chen | |
| 2017/0206707 A1* | 7/2017 | Guay | G06F 17/30327 |
| 2017/0249073 A1* | 8/2017 | Thompson | G06Q 10/0639 |
| 2017/0285738 A1* | 10/2017 | Khalid | G06F 3/013 |
| 2017/0286993 A1* | 10/2017 | Khalid | G06Q 30/0241 |
| 2018/0012408 A1* | 1/2018 | Gentilin | H04L 67/141 |
| 2018/0082227 A1* | 3/2018 | Goedken | G06Q 10/063 |
| 2018/0165830 A1* | 6/2018 | Danieau | G06T 7/73 |
| 2018/0182381 A1* | 6/2018 | Singh | G06F 17/2775 |
| 2018/0191952 A1* | 7/2018 | Ardo | H04N 21/2187 |
| 2019/0196576 A1* | 6/2019 | Saarinen | G06F 3/013 |

\* cited by examiner

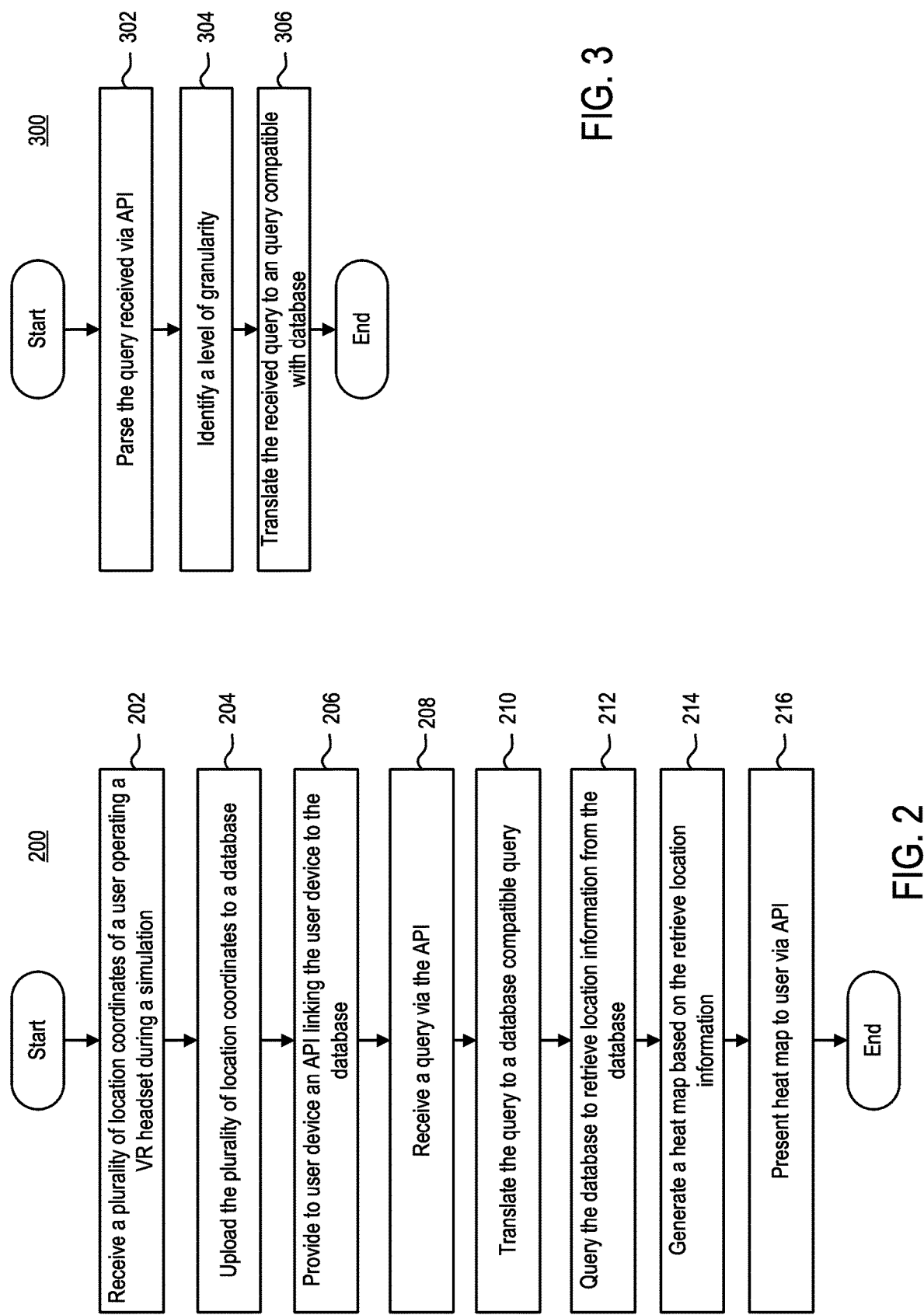

METHOD AND SYSTEM FOR TRACKING VIRTUAL REALITY EXPERIENCES

FIELD OF THE DISCLOSURE

The present disclosure generally relates to a method and a system for tracking virtual reality experiences.

BACKGROUND

As virtual reality (VR) technology continues to rapidly improve, the applications of VR technology to existing fields continues to grow. Virtual reality technology may be implemented into a variety of fields, such as, for example, healthcare, advertisement, entertainment, travel, and the like. Similarly, VR devices continue to improve, and have become more readily available as the price of the technology decreases. With this combination, VR technology has become ever more prevalent in the digital age.

SUMMARY

Embodiments disclosed herein generally relate to a system and method for tracking virtual reality experiences. In one embodiment, a method is disclosed herein. A computing system receives a plurality of location coordinates of a user during a virtual reality simulation. The computing system uploads the plurality of location coordinates to a database. The computing system prompts a client device that an application programming interface (API) linking the client device of the user to functionality of the database is available. The computing system receives a query via the API. The computing system translates the received query to a query compatible with the database. The computing system queries the database using the received query for according to a criteria set forth in the received query to retrieve a set of location information. The computing system generates a heat map based on the retrieved location information. The computing system prompts the remote client device, via a second API, that the heat map is available for display.

In some embodiments, translating the received query to a query compatible with the database includes the computing system parsing the received query. The computing system identifies a level of granularity requested for the set of location information. The computing system translates the received query to a structured query language (SQL) command based on the level of granularity.

In some embodiments, translating the received query to a structured query language (SQL) command based on the level of granularity includes the computing system splitting a location comprising the plurality of location coordinates into a plurality of discrete segments. The computing system generates the heat map based on the plurality of discrete segments.

In some embodiments, receiving a plurality of location coordinates of a user during a virtual reality simulation includes the computing system receiving a first plurality of location coordinates corresponding to a location of a user's gaze. The computing system receives a second plurality of location coordinates corresponding to a location of a user's hands.

In some embodiments, the computing system further receives a third plurality of location coordinates corresponding to a rotation of a user's head.

In some embodiments, each location coordinate of the plurality of location coordinates includes an x-coordinate, a y-coordinate, and a z-coordinate.

In some embodiments, the database is a PostGIS database.

In another embodiment, a method is disclosed herein. A computing system receives, from a virtual reality headset, a software development kit comprising a plurality of location coordinates corresponding to a gaze of a user during a virtual reality simulation. The computing system uploads the plurality of location coordinates to a database. The computing system generates an application programming interface (API) linking a remote client device to functionality of the objection-relational database. The computing system prompts the remote client device that the API is available to receive one or more parameters to query the database. The computing system receives the one or more parameters via the API from the remote client device. The computing system queries the database using the received query according to a criteria set forth in the received query to retrieve a set of location information. The computing system generates a heat map based on the retrieved location information. The computing system prompts the remote client device, via a second API, that the heat map is available for display.

In some embodiments, querying the database using the received query according to a criteria set forth in the received query to retrieve a set of location information includes the computing system parsing the received query. The computing system identifies a level of granularity requested for the set of location information. The computing system translates the received query to a structured query language (SQL) command based on the level of granularity.

In some embodiments, translating the received query to the SQL command based on the level of granularity includes the computing system splitting a location comprising the plurality of location coordinates into a plurality of discrete segments. The computing system generates the heat map based on the plurality of discrete segments.

In some embodiments, the computing system further receives a second plurality of location coordinates corresponding to a location of a user's hands.

In some embodiments, the computing system further receives a third plurality of location coordinates corresponding to a rotation of a user's head.

In some embodiments, each location coordinate of the plurality of location coordinates includes an x-coordinate, a y-coordinate, and a z-coordinate.

In some embodiments, the database is a PostGIS database.

In another embodiment, a system is disclosed herein. The system includes a processor and a memory. The memory has programming instructions stored thereon, which, when executed by the processor, performs an operation. The operation includes receiving, from a virtual reality headset, a software development kit comprising a plurality of location coordinates corresponding to a gaze of a user during a virtual reality simulation. The operation includes uploading the plurality of location coordinates to a database. The operation includes generating an application programming interface (API) configured to receive a query from a remote client device. The operation includes prompting the remote client device that the API is available to receive one or more parameters to query the database. The operation includes receiving the one or more parameters via the API from the remote client device. The operation includes querying the database using the received query according to a criteria set forth in the received query to retrieve a set of location information. The operation includes generating a heat map based on the retrieved location information. The operation includes prompting the remote client device, via a second API, that the heat map is available for display.

In some embodiments, the operation of querying the database using the received query according to a criteria set forth in the received query to retrieve a set of location information includes the operations of parsing the received query, identifying a level of granularity requested for the set of location information, and translating the received query to a structured query language (SQL) command based on the level of granularity.

In some embodiments, the operation of translating the received query to the SQL command based on the level of granularity includes the operations of splitting a location comprising the plurality of location coordinates into a plurality of discrete segments and generating the heat map based on the plurality of discrete segments.

In some embodiments, the operation further includes receiving a second plurality of location coordinates corresponding to a location of a user's hands.

In some embodiments, the operation further includes receiving a third plurality of location coordinates corresponding to a rotation of a user's head.

In some embodiments, each location coordinate of the plurality of location coordinates includes an x-coordinate, a y-coordinate, and a z-coordinate.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

FIG. 2 is a block diagram of a location in a virtual reality experiences, according to one embodiment.

FIG. 3 is a flow diagram illustrating a method of tracking a virtual reality experience of a user, according to one embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure generally relates to a method and a system for tracking virtual reality experiences. In some embodiments, one or more techniques disclosed herein leverage information included in a software development kit (SDK) of a virtual reality (VR) headset to track one or more locations of a user's gaze, hand position, head position, and the like, while interacting with a VR environment. Based on the one or more locations, the one or more techniques disclosed herein may generate a heat map that visually illustrates area of the VR environment that are most frequently viewed by the users during the VR experience. In some embodiments, the one or more techniques discussed herein may be tuned to a level of granularity defined by the user. For example, a user may define a level of detail in which the one or more systems disclosed herein generate the heat map.

In some embodiments, the one or more techniques disclosed herein implement an object relational database to store the plurality of location coordinates. Such object relational database aids in efficient storage and retrieval of the one or more location coordinates for the generation of the heat map. With this information, an entity associated with the system may be able to dynamically position elements in three-dimensional space based on feedback from one or more users. For example, if a content developer wants a user to see an advertisement on the wall of a building in three-dimensional space, the developer may place the advertisement on the wall in which the developer assumes most people will see. As an increased number of people partake in the VR simulation, the one or more techniques disclosed herein help identify if the initial placement of the advertisement, for example, was correct, or if the placement of the advertisement needs to be moved.

The term "user" as used herein includes, for example, a person or entity that owns a computing device or wireless device; a person or entity that operates or utilizes a computing device; or a person or entity that is otherwise associated with a computing device or wireless device. It is contemplated that the term "user" is not intended to be limiting and may include various examples beyond those described.

Figure 1:
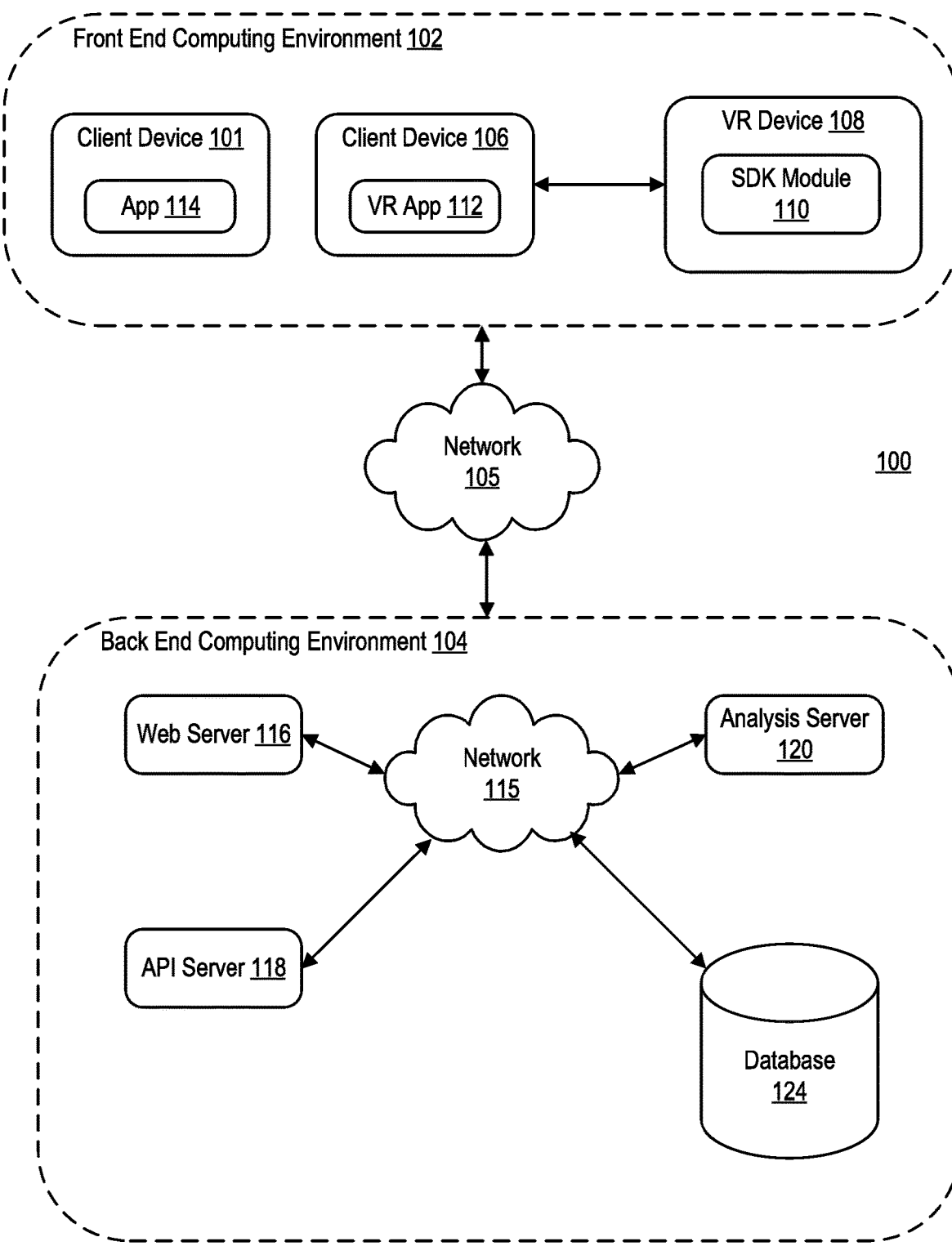
FIG. 1 is a block diagram illustrating a computing environment, according to one embodiment.

FIG. 1 is a block diagram illustrating a computing environment 100, according to one embodiment. Computing environment 100 may include at least front end computing environment 102 and back end computing environment 104 communicating via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data. For example, network 105 may include any type of computer networking arrangement used to exchange information. For example, network 105 may be the Internet, a private data network, virtual private network using a public network and/or other suitable connection(s) that enables components in computing environment 100 to send and receiving information between the components of system 100.

Front end computing environment 102 may include at least client device 101, client device 106 and virtual reality (VR) device 108. In some embodiments, client device 106 may communicate with VR device 108 via a wired connection therebetween. In some embodiments, client device 106 may communicate with VR device 108 via a wireless communication. Client device 106 may be operated by a user. For example, client device 102 may be a mobile device, a tablet, a desktop computer, or any computing system having the capabilities described herein.

Client device 106 may include at least VR application 112. VR application 112 may be configured to interface with VR device 108. For example, VR application 112 may be an application that corresponds to VR device 108.

Client device 101 may be associated with an entity attempting to access functionality of back end computing environment 104. Client device 101 may include at least application 114. Application 114 may be representative of a web browser that allows access to a website or a stand-alone application. Client device 101 access application 114 to access functionality of back end computing environment 104. Client device 101 may communicate over network 105 to request a webpage, for example, from web server 116 in back end computing environment 104. For example, client device 101 may be configured to execute application 114 to access content management by web server 116. The content that is displayed to client device 101 may be transmitted from web server 116 to client device 101, and subsequently processed by application 112 for display through a graphical user interface (GUI) of client device 101.

VR device 108 is configured to provide a virtual reality (VR) experience to a user of VR device 108. VR device 108 may be a head-mounted device worn by a user. VR device 108 may be configured to record at least head movements and hand movements (generally bodily movements) of the user during the VR experience. In some embodiments, VR device 108 may work in conjunction with VR application 112 executing on client device 106. In some embodiments, VR device 108 may be a stand-alone device, configured to execute a respective VR application (not shown).

VR device 108 may include software development kit (SDK) module 110. SDK module 110 may include an SDK that may be a set of software development tools that allows the creation of application for a certain software package, software framework, hardware platform, computer system, video game console, operating system, and the like. SDK module 110 may be configured to track one or more locations of a user throughout the VR experience. In some embodiments, SDK module 110 may track a movement of a user's head during the VR experience. In some embodiments, SDK module 110 may track a movement of a user's hands during the VR experience. In some embodiments, SDK module 110 may track a movement of a user's gaze during the VR experience. SDK module 110 may transmit the one or more coordinates of the user to client device 106 for further analysis.

In operation, for example, an entity associated with client device 101 and/or back end computing environment 104 may develop a VR experience for an end use that involves the end user interacting in an environment provided by the entity. For example, a financial institution may create a VR experience to track a user (or customer) in a branch location to track a user's movement, gaze, etc. throughout the branch visit. In another example, a financial institution may create a VR experience to track a user's motion while interacting with an automated teller machine (ATM) to determine a desired layout of the ATM. In another example, an advertising company may want to identify a location in a facility that is frequently viewed for subsequent placement of an advertisement. VR application 112 may may transmit the recorded coordinates of the user to back end computing environment 104, for example, for further analysis regarding one or more locations frequently viewed (or interacted with) by the user.

Front end computing environment 102 may communicate with back end computing environment 104 over network 105. Back end computing environment 104 may be associated with an entity or an organization (e.g., financial institution). Back end computing environment 104 may include web server 116, API server 118, database 124, and analysis server 120. Web server 116, API server 118, database 124, and analysis server 120 may communicate via network 115.

Network 115 may be of any suitable type, including individual connections via the Internet, such as cellular or Wi-Fi networks. In some embodiments, network 115 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 115 may include any type of computer networking arrangement used to exchange data. For example, network 115 may include any type of computer networking arrangement used to exchange information. For example, network 115 may be the Internet, a private data network, virtual private network using a public network and/or other suitable connection(s) that enables components in computing environment 100 to send and receiving information between the components of system 100.

Web server 116 may be configured to communicate with application 112 executing on client device 101. For example, web server 116 may provide one or more web pages that allows client device 101 to access functionality of back end computing system 104. In some embodiments, web server 116 may transmit content to client device 101, which is subsequently processed by application 112 for display through a GUI of client device 106.

API server 118 may include a computer system configured to execute one or more APIs that provide various functionalities related to the operations of back end computing environment 104. In some embodiments, API server 118 may include API adapter that allow API server 118 to interface with and utilize enterprise APIs maintained by back end computing environment 104 and/or an associated entity that may be housed on other systems or devices. In some embodiments, APIs may provide functions that include, for example, receiving one or more parameters for a query from client device 101, executing a query based on the one or more parameters, linking client device 101 to back end computing environment 104, and any other such function related to the analysis of user movement and actions during a VR session. API server 118 may include one or more processors 134 and one or more API databases 136, which may be any suitable repository of API information. Information stored in API server 118 may be accessed via network 115 and/or network 105 by one or more components of back end computing environment 104. In some embodiments, API processor 134 may be configured to access, modify, and retrieve information from database 124.

Database 124 may be configured to store one or more sets of coordinates received from client device 106 during one or more VR sessions. In some embodiments, database 124 may be an object-relational database. Accordingly, database 124 may be configured to support objects, classes, and inheritances to be stored therein, while allowing end users to query database using structured query language (SQL) commands. In some embodiments, database 124 may be a PostGIS database that may receive PostgreSQL commands. In some embodiments, database 124 may be a non-relational database. For example, the disclosed techniques may also be implemented with a NoSQL database or data store. In some embodiments, database 124 may be a filesystem (e.g., Amazon Web Services S3, Apache Hadoop Distributed File System (HDFS), and the like).

Analysis server 120 may be configured to analyze movement of a user operating VR device 108 during a VR experience. In some embodiments, analysis server 120 may receive one or more parameters from client device 106 for analysis. For example, analysis server 120 may receive a plurality of coordinates corresponding to bodily movements of the user wearing the VR device 108 during the VR experience.

Analysis server 120 may receive the one or more parameters from client device 101 via an API, generated by API server 118, that links client device 101 to back end computing environment 102. In some embodiments, the plurality of coordinates may correspond to a location of a user's gaze during the VR experience. In some embodiments, the plurality of coordinates may correspond to a location of a user's head during the VR experience. In some embodiments, the plurality of coordinates may correspond to a location of a user's hands during the VR experience.

Analysis server 120 may further receive one or more parameters to generate a query to execute against database 124. The query may be used to generate a heat map of user's gaze throughout the VR experience. For example, analysis server 120 may query database to determine one or more hot spots or dead zones in the VR simulation. Based off of this information, an entity associated with back end computing environment 104 may dynamically position elements in 3D space in real-time (or near real-time). The one or more parameters of the query may include a criteria. The criteria may include, for example, a level of granularity for the query. The level of granularity may be directed to a level of detail in which analysis server 120 analyzes the set of coordinates.

In operation, client device 101 may access functionality of back end computing environment 104 via application 114 executing thereon. In some embodiments, client device 106 may transmit SDK by accessing VR application 112. SDK may include one or more coordinates corresponding to a gaze of a user during a VR experience. In some embodiments, the one or more coordinates may further correspond to one or more bodily location, such as head location and hand locations. API server 118 may store the received coordinate into database 124. API server 118 is configured to generate an API to receive one or more query parameters for database 124. For example, web server 116 may notify client device 101 that an API to query database 124 is available. Based on the received query, analysis server 120 may generate a heat map for display to the user. The heat map may illustrate one or more locations in the VR simulation that the user concentrated on (i.e., looked at/viewed) most frequently.

FIG. 2 is a flow diagram of a method 200 of tracking a virtual reality experience of a user, according to one embodiment. Method 200 begins at step 202. At step 202, back end computing environment 104 receives a plurality of location coordinates of a user operating a VR headset during a simulation. In some embodiments, back end computing environment may receive the plurality of location coordinates via VR application 112 executing on client device 106. For example, client device 106 may automatically transmit the one or more parameters to web server 116 via VR application 11. In some embodiments, back end computing environment 104 may receive the plurality of location coordinates via receiving SDK. For example, SDK may include the plurality of coordinates recorded during the VR session.

At step 204, back end computing environment 104 may upload the plurality of location coordinates to database 124. API server 118 may parse, for example, the received SDK to identify the plurality of location coordinates contained therein. In some embodiments, API server 118 may further upload a coordinate system of VR device 108 stored in SDK. For example, the coordinate system of VR device 108 may provide additional information about the relative location of each location coordinate. Each location coordinate of the plurality of location coordinates may include an x-component, a y-component, and a z-component. As such, each location coordinate may be a triplet (i.e., (x, y, z)).

At step 206, back end computing environment may generate an API that links user device 101 to database 124. API server 118 may generate an API that provides an interface to allow users of client device 101 to enter one or more parameters. The one or more parameters may act as input to a query against database 124. In some embodiments, API server 118 may notify client device 101 that an API is available. Client device 101 may access the functionality of API server 118 via application 114 executing thereon. Accordingly, users of client device 101 may submit one or more parameters directed to the generation of a heat map that illustrates particular "hot spots" or "dead zones" in the VR simulation based on, for example, the gaze and bodily locations of the user.

At step 208, back end computing environment 104 may receive a query from client device 101. Web server 116 may receive the query from client device 101 via the API accessed through application 114. The query may include one or more parameters directed to the generation of a heat map. In some embodiments, the query may include a level of granularity, i.e., a level of detail in which to generate the heat map. In other words, user of client device 101 may define the level of detail in which analysis server 120 will generate the heat map. Such level of granularity may be described, for example, in terms rectangular dimensions. For example, the user may define the level of granularity to be L×W×H, where L corresponds to length of a box (i.e., three-dimensional rectangle), W corresponds to width of the box, and H corresponds to height of the box. Accordingly, when analysis server 120 generates the heat map, analysis server 120 may segment the VR simulation location into a plurality of boxes with the dimensions specified in the query. Those skilled in the art may readily understand that a finer level of granularity (e.g., 1 cm×1 cm×1 cm) compared to a more obtuse level of granularity (e.g., 1 m×1 m×1 m) will provide a more detailed level of analysis.

At step 210, back end computing environment 104 may translate the received query into a query compatible with database 124. In some embodiments, analysis agent 120 may translate the received one or more parameters into a SQL query. In some embodiments, analysis agent 120 may translate the received one or more parameters into a query that is compatible with database 124.

FIG. 3 is a flow diagram illustrating step 210 in further detail, according to one embodiment. At step 302, analysis server 120 may parse the query received via API. For example, analysis server 120 may identify one or more parameters transmitted from client device 101 to web server 116 via application 114.

At step 304, analysis server 120 may identify a level of granularity defined in the query. For example, analysis server 120 may parse the one or more parameters to identify the level of granularity defined by the user. The level of granularity defined in the query may be used by analysis server 120 in generating the heat map using the retrieved location coordinates from database 124.

At step 306, analysis server 120 may translate the received query to a query that is compatible with database 124. In some embodiments, analysis agent 120 may translate the received one or more parameters into a SQL query. In some embodiments, analysis agent 120 may translate the received one or more parameters into a query that is compatible with database 124.

Referring back to FIG. 2, at step 212, back end computing environment 104 may query database 124 using the translated query (generated in step 210). For example, analysis server 120 may query database using the database-compatible query generated above to retrieve a plurality of location coordinates of the user during the VR session. In some embodiments, the query may request location coordinates related to a location of the user's gaze during the VR experience. In some embodiments, the query may request location coordinates related to a location of the user's body at various parts of the VR experience. In some embodiments, the query may request location coordinates related to one or more of the user's gaze, the position of the user's hands, the location of the user's head, the rotation of the user's head, the rotation of the user's hands, and the like.

At step 214, back end computing environment 104 may generate a heat map based on the retrieved location information. The heat map may be a graphical representation of data (i.e., location coordinates) where the individual values contained in a matrix are represented as colors. Each color in the heat map may correspond to a different level of concentration of location coordinates. Analysis server 120 may generate the heat map based on the level of granularity defined by the user. For example, analysis server 120 may split a location in the VR experience into a plurality of discrete segments. Each discrete segment may include one or more location coordinates. Analysis server 120 may generate the heat map based on a concentration of one or more location coordinates in each discrete segment. For example, analysis server 120 may count a number of location coordinates in each discrete segment, and assign each segment a concentration level based on the number of location coordinates contained therein. Those discrete segments with the highest number of location coordinates may be described as "hot spots," i.e., those locations that the user has viewed most frequently. Those discrete segments with the lowest number of location coordinates may be described as "cold spots," i.e., those locations that user viewed least frequently, or ignored.

At step 216, back end computing environment 104 may present the heat map to the user. API server 118 may generate an API that allows user to view, access, manipulate the heat map via application 114 executing on client device 106. For example, web server 116 may notify client device 106 via application 114 that an API is available to access the generated heat map. Web server 116 may provide API to client device 106 such that user of client device 106 may access the heat map.

The generated heat map may provide an entity with a variety of information regarding the user's interaction with the VR environment. In some embodiments, the information may aid the entity in determining location of certain items in a real-world environment. For example, the entity may generate a VR environment in which several advertisements are placed. From the heat map, the entity may determine that certain locations in the VR environment are more appealing than others for advertisement placement. From the heat map, the entity may also determine that certain advertisements are deemed more desirable than others (e.g., those viewed less frequently based on the location coordinates). In another example, the entity may generate a VR environment in which an ATM is located. From the heat map, the entity may determine that users of the ATM frequently look towards a specific area in anticipation of a credit card slot being located therein. In both scenarios, the generated heat map based on the user's viewing of items in the VR environment may translate into the positioning (or re-positioning) of items in a real-world environment into more favorable locations.

Figure 4:
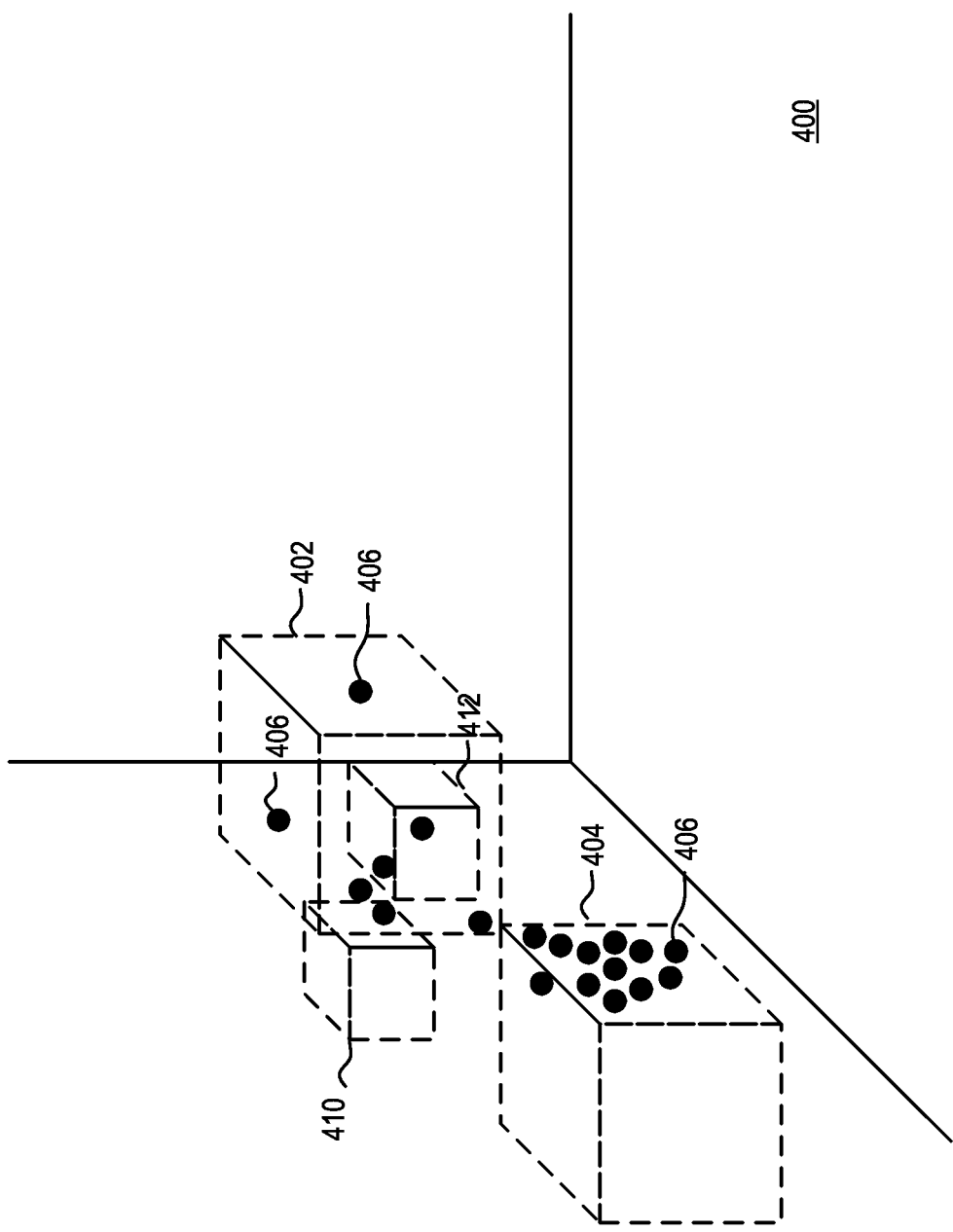
FIG. 4 is a flow diagram illustrating an operation of the method of FIG. 3 in further detail, according to one embodiment.

FIG. 4 is a block diagram 400 of a location in a virtual reality experiences, according to one embodiment. As recited above in conjunction with step 314, a heat map may be generated based on a level of granularity defined by the user. Illustrated in block diagram 400 are two sets of discrete segments based on different levels of granularity. The first set of discrete segments is block 402 and block 404. The second set of discrete segments is block 410 and block 412. The first set of discrete segments (block 402 and block 404) has a more obtuse level of granularity compared to the second set of discrete segments (block 410 and block 412). Each discrete segment may include one or more location coordinates 406 contained therein. As illustrated, block 404 includes a higher concentration of location coordinates than block 402, and therefore, would be illustrated differently on the heat map. Similarly, block 412 includes a higher concentration of location coordinates than block 410, and therefore, would be illustrated differently on the heat map.

Figure 5:
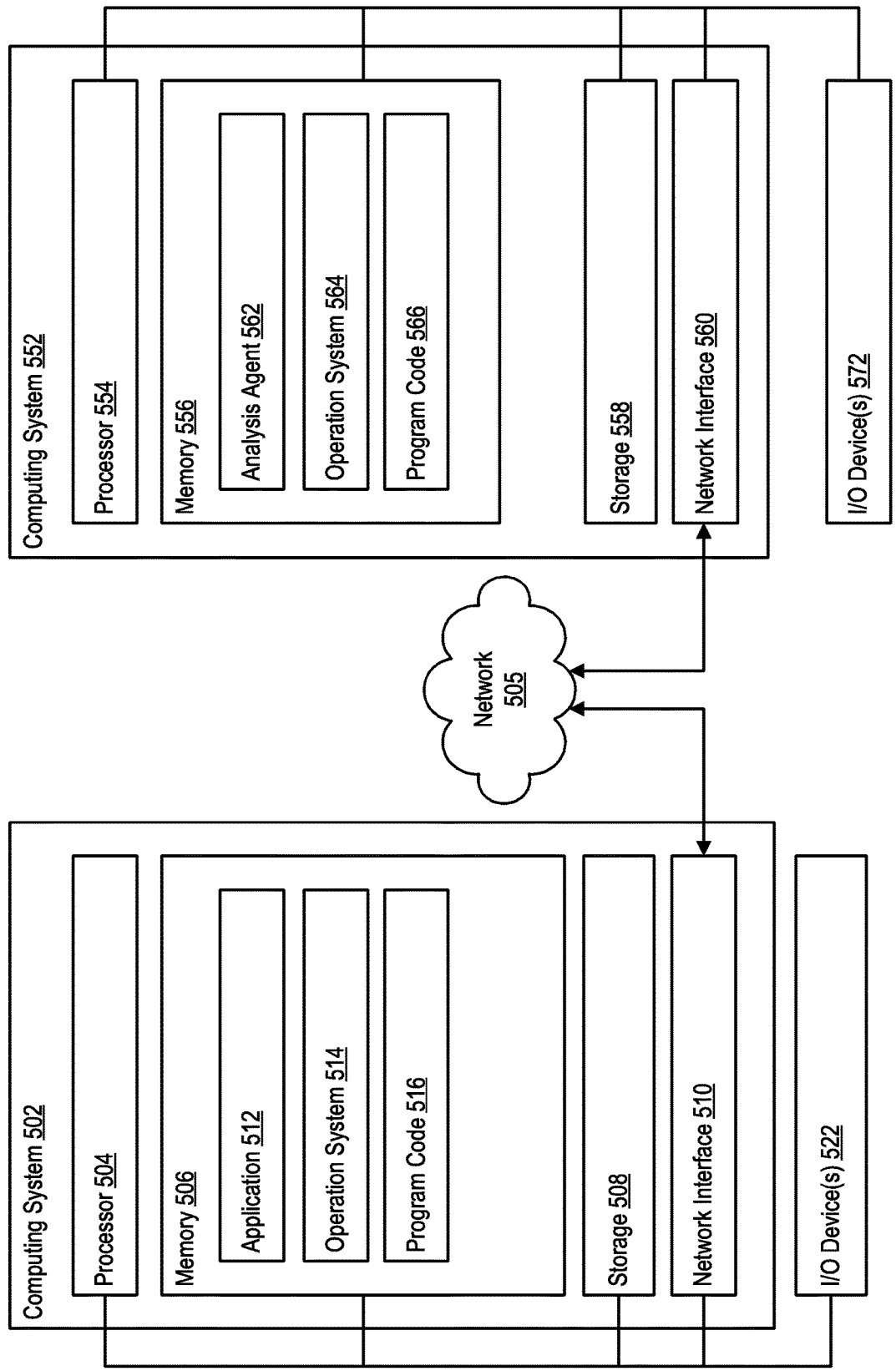
FIG. 5 is a block diagram illustrating a computing environment, according to one embodiment.

FIG. 5 is a block diagram illustrating an exemplary computing environment 500, according to some embodiments. Computing environment 500 includes computing system 502 and computing system 552. Computing system 502 may be representative of client device 102. Computing system 552 may be representative of a computing system of analysis server 120.

Computing system 502 may include a processor 504, a memory 506, a storage 508, and a network interface 510. In some embodiments, computing system 502 may be coupled to one or more I/O device(s) 522 (e.g., keyboard, mouse, etc.).

Processor 504 retrieves and executes program code 516 (i.e., programming instructions) stored in memory 506, as well as stores and retrieves application data. Processor 504 is included to be representative of a single processor, multiple processors, a single processor having multiple processing cores, and the like. Network interface 510 may be any type of network communications allowing computing system 552 to communicate externally via computing network 505. For example, network interface 510 is configured to enable external communication with computing system 552.

Storage 508 may be, for example, a disk storage device. Although shown as a single unit, storage 508 may be a combination of fixed and/or removable storage devices, such as fixed disk drives, removable memory cards, optical storage, network attached storage (NAS), storage area network (SAN), and the like.

Memory 506 may include application 512, operating system 514, and program code 516. Program code 516 may be accessed by processor 504 for processing (i.e., executing program instructions). Program code 516 may include, for example, executable instructions for communicating with computing system 552 to generate heat map based on parameters specified by the end user. Application 512 may enable a user of computing system 502 to access a functionality of computing system 552. The content that is displayed to a user of computing system 502 (e.g., generated heat map) may be transmitted from computing system 552 to computing system 502, and subsequently processed by application 512 for display through a graphical user interface (GUI) of computing system 502.

Computing system 552 may include a processor 554, a memory 556, a storage 558, and a network interface 560. In some embodiments, computing system 502 may be coupled to one or more I/O device(s) 572. In some embodiments, computing system 502 may be in communication with database 124.

Processor 554 retrieves and executes program code 566 (i.e., programming instructions) stored in memory 556, as well as stores and retrieves application data. Processor 554 is included to be representative of a single processor, multiple processors, a single processor having multiple processing cores, and the like. Network interface 560 may be any type of network communications enabling computing system 552 to communicate externally via computing network 505. For example, network interface 560 allows computing system 552 to communicate with computer system 502.

Storage 558 may be, for example, a disk storage device. Although shown as a single unit, storage 558 may be a combination of fixed and/or removable storage devices, such as fixed disk drives, removable memory cards, optical storage, network attached storage (NAS), storage area network (SAN), and the like.

Memory 556 may include analysis agent 562, operating system 564, program code 566, and verification agent 114. Program code 566 may be accessed by processor 554 for processing (i.e., executing program instructions). Program code 566 may include, for example, executable instructions configured to perform steps discussed above in conjunction with FIGS. 2-3. As an example, processor 554 may access program code 566 to perform operations for generating a heat map of user interaction in a VR simulation.

Analysis agent 562 may be configured to analyze movement of a user operating VR device 108 during a VR experience. In some embodiments, analysis server 562 may receive one or more parameters from client device 101 for analysis. For example, analysis server 120 may receive a plurality of coordinates corresponding to bodily movements of the user wearing the VR device 108 during the VR experience. In some embodiments, the plurality of coordinates may correspond to a location of a user's gaze during the VR experience. In some embodiments, the plurality of coordinates may correspond to a location of a user's head during the VR experience. In some embodiments, the plurality of coordinates may correspond to a location of a user's hands during the VR experience. Analysis server 120 may further receive one or more parameters to generate a query to execute against database 124. The query may be used to generate a heat map of user's gaze throughout the VR experience. For example, analysis server 120 may query database to determine one or more hot spots or dead zones in the VR simulation.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed:

1. A method, comprising:
   receiving a plurality of location coordinates of a user during a virtual reality simulation, wherein the plurality of location coordinates are three-dimensional coordinates;
   uploading the plurality of location coordinates to a database;
   prompting a client device that an application programming interface (API) linking the client device of the user to functionality of the database is available;
   receiving a query via the API, the query comprising one or more parameters defining a level of granularity for generating a heat map;
   translating the received query to a query compatible with the database;
   querying database using the received query according to a criteria set forth in the received query to retrieve a set of location information;
   generating a heat map based on the retrieved location information by segmenting the virtual reality simulation into a plurality of discrete segments in accordance with the defined level of granularity and assigning each discrete segment a concentration level based on a number of location coordinates contained in each respective discrete segment; and
   prompting the client device, via a second API, that the heat map is available for display.

2. The method of claim 1, wherein translating the received query to a query compatible with the database, comprises:
   parsing the received query;
   identifying a level of granularity requested for the set of location information; and
   translating the received query to a structured query language (SQL) command based on the level of granularity.

3. The method of claim 1, wherein receiving a plurality of location coordinates of a user during a virtual reality simulation, comprises:
receiving a first plurality of location coordinates corresponding to a location of a user's gaze; and
receiving a second plurality of location coordinates corresponding to a location of a user's hands.

4. The method of claim 3, further comprising:
receiving a third plurality of location coordinates corresponding to a rotation of a user's head.

5. The method of claim 1, wherein each location coordinate of the plurality of location coordinates includes an x-coordinate, a y-coordinate, and a z-coordinate.

6. The method of claim 1, wherein the database is a PostGIS database.

7. The method of claim 1, wherein the virtual reality simulation tracks the user interacting with an automated teller machine (ATM) to determine a desired layout for the ATM.

8. The method of claim 7, wherein the heat map identifies locations on the ATM with which the user interacts most frequently.

9. A method, comprising:
receiving, from a virtual reality headset, a software development kit comprising a plurality of location coordinates corresponding to a gaze of a user during a virtual reality simulation;
uploading the plurality of location coordinates to a database;
generating an application programming interface (API) linking a remote client device to functionality of the database;
prompting the remote client device that the API is available to receive one or more parameters to query the database;
receiving the one or more parameters via the API from the remote client device, the one or more parameters defining a level of granularity for generating a heat map;
querying the database using the received query according to a criteria set forth in the received query to retrieve a set of location information;
generating a heat map based on the retrieved location information, by segmenting the virtual reality simulation into a plurality of discrete segments in accordance with the defined level of granularity and assigning each discrete segment a concentration level based on a number of location coordinates contained in each respective discrete segment; and
prompting the remote client device, via a second API, that the heat map is available for display.

10. The method of claim 9, wherein querying the database using the received query according to a criteria set forth in the received query to retrieve a set of location information, comprises:
parsing the received query;
identifying a level of granularity requested for the set of location information; and
translating the received query to a structured query language (SQL) command based on the level of granularity.

11. The method of claim 9, further comprising:
receiving a second plurality of location coordinates corresponding to a location of a user's hands.

12. The method of claim 11, further comprises:
receiving a third plurality of location coordinates corresponding to a rotation of a user's head.

13. The method of claim 9, wherein each location coordinate of the plurality of location coordinates includes an x-coordinate, a y-coordinate, and a z-coordinate.

14. The method of claim 9, wherein the database is a PostGIS database.

15. A system, comprising:
a processor; and
a memory having programming instructions stored thereon, which, when executed by the processor, performs an operation comprising:
receiving, from a virtual reality headset, a software development kit comprising a plurality of location coordinates corresponding to a gaze of a user during a virtual reality simulation;
uploading the plurality of location coordinates to a database;
generating an application programming interface (API) configured to receive a query from a remote client device;
prompting the remote client device that the API is available to receive one or more parameters to query the database;
receiving the one or more parameters via the API from the remote client device, the one or more parameters defining a level of granularity for generating a heat map;
querying the database using the received query according to a criteria set forth in the received query to retrieve a set of location information;
generating a heat map based on the retrieved location information, by segmenting the virtual reality simulation into a plurality of discrete segments in accordance with the defined level of granularity and assigning each discrete segment a concentration level based on a number of location coordinates contained in each respective discrete segment; and
prompting the remote client device, via a second API, that the heat map is available for display.

16. The system of claim 15, wherein querying the database using the received query according to a criteria set forth in the received query to retrieve a set of location information, comprises:
parsing the received query;
identifying a level of granularity requested for the set of location information; and
translating the received query to a structured query language (SQL) command based on the level of granularity.

17. The system of claim 15, wherein the operation further comprising:
receiving a second plurality of location coordinates corresponding to a location of a user's hands.

18. The system of claim 17, wherein the operation further comprises:
receiving a third plurality of location coordinates corresponding to a rotation of a user's head.

19. The system of claim 15, wherein each location coordinate of the plurality of location coordinates includes an x-coordinate, a y-coordinate, and a z-coordinate.

* * * * *